(12) United States Patent
Rokicki

(10) Patent No.: US 9,830,471 B1
(45) Date of Patent: Nov. 28, 2017

(54) OUTCOME-BASED DATA PROTECTION USING MULTIPLE DATA PROTECTION SYSTEMS

(71) Applicant: EMC Corporation, Hopkinton, MA (US)

(72) Inventor: John C. Rokicki, Rutland, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 160 days.

(21) Appl. No.: 14/737,841

(22) Filed: Jun. 12, 2015

(51) Int. Cl.
*G06F 12/00* (2006.01)
*G06F 13/00* (2006.01)
(Continued)

(52) U.S. Cl.
CPC .......... *G06F 21/6236* (2013.01); *G06F 12/14* (2013.01); *G06F 2221/032* (2013.01)

(58) Field of Classification Search
CPC . G06F 9/46; G06F 9/547; G06F 11/10; G06F 11/1076; G06F 12/14; G06F 12/1408; G06F 12/1416; G06F 12/145; G06F 12/1458; G06F 12/1466; G06F 12/1483; G06F 12/1491; G06F 21/00; G06F 21/10; G06F 21/105; G06F 21/12; G06F 21/121; G06F 21/123; G06F 21/125; G06F 21/126; G06F 21/128; G06F 21/14; G06F 21/30; G06F 21/305; G06F 21/31; G06F 21/313; G06F 21/316; G06F 21/32; G06F 21/33; G06F 21/335; G06F 21/34; G06F 21/35; G06F 21/50; G06F 21/60; G06F 21/608; G06F 21/62; G06F 21/6209; G06F 21/6218; G06F 21/6227; G06F 21/6236;

(Continued)

(56) References Cited

U.S. PATENT DOCUMENTS

| 7,689,676 B2* | 3/2010 | Vinberg | G06F 8/61 |
| | | | 703/20 |
| 7,840,595 B1* | 11/2010 | Blitzer | G06F 11/1458 |
| | | | 707/781 |

(Continued)

OTHER PUBLICATIONS

A General-Purpose Architecture for Replicated Metadata Services in Distributed File Systems; Stamatakis et al; IEEE Transactions on Parallel and Distributed Systems, vol. PP, iss. 99; May 2, 2017; pp. 1-14 (14 pages).*

*Primary Examiner* — Daniel C Chappell
(74) *Attorney, Agent, or Firm* — Blakely, Sokoloff, Taylor & Zafman LLP

(57) ABSTRACT

In response to a request for data protection of a first resource of a first system, data protection methods are identified to provide data protection for the first resource. One or more of the data protection methods are selected based on one or more data protection objectives of a data protection plan that is associated with the first resource. The data protection objectives collectively specify an expected outcome of the data protection plan. For each of the selected data protection methods, a list of actions to be performed is determined to satisfy expected outcome of the data protection objectives. The list of actions is deployed to the first system and a second system that provides data protection for the first system, including provisioning one or more data protection services in the first and second systems to carry out the list of actions.

24 Claims, 14 Drawing Sheets

(51) Int. Cl.
*G06F 13/28* (2006.01)
*G06F 21/62* (2013.01)
*G06F 12/14* (2006.01)

(58) Field of Classification Search
CPC .......... G06F 21/6245; G06F 21/6254; G06F 21/6281; G06F 21/64; G06F 21/70; G06F 21/77; G06F 21/78; G06F 21/79; G06F 21/82; G06F 21/87; G06F 2211/007; G06F 2221/0702; G06F 2221/0744; G06F 2221/21; G06F 2221/032; G06F 2221/2107; G06F 2221/2137; G06F 2221/2141; G06F 2221/2143; G06F 2221/2145; G06F 2221/2147; G06F 2221/2149; H04L 29/06877; H04L 9/00; Y10S 705/908; Y10S 705/911; Y10S 705/912

See application file for complete search history.

(56) References Cited

U.S. PATENT DOCUMENTS

| | | | | |
|---|---|---|---|---|
| 8,032,557 B1* | 10/2011 | Vijendra | ................ | G06Q 10/06 707/783 |
| 8,180,743 B2* | 5/2012 | Claudatos | ......... | G06F 17/30085 707/694 |
| 8,185,505 B1* | 5/2012 | Blitzer | ................ | G06F 11/1458 707/610 |
| 8,229,904 B2* | 7/2012 | Claudatos | ......... | G06F 17/30085 707/694 |
| 8,307,238 B1* | 11/2012 | Schmokel | ........... | G06F 11/0748 714/1 |
| 8,429,307 B1* | 4/2013 | Faibish | ................. | G06F 3/0605 710/1 |
| 8,522,248 B1* | 8/2013 | Nair | .................... | G06F 9/5027 718/104 |
| 8,612,570 B1* | 12/2013 | Nair | ................... | H04L 41/5003 709/224 |
| 8,719,263 B1* | 5/2014 | Nair | .................. | G06F 17/30607 707/736 |
| 8,762,662 B1* | 6/2014 | Blitzer | ................. | G06F 3/0605 711/114 |
| 8,782,784 B1* | 7/2014 | Bruskin | .............. | H04L 63/1425 713/2 |
| 8,819,212 B1* | 8/2014 | Nair | .................. | G06F 17/30705 709/223 |
| 8,832,784 B2* | 9/2014 | Budko | .................... | G06F 21/53 709/227 |
| 9,323,789 B1* | 4/2016 | Elliott, IV | ........ | G06F 17/30286 |
| 9,323,901 B1* | 4/2016 | Nair | ....................... | G06F 21/10 |
| 9,419,996 B2* | 8/2016 | Porat | .................... | G06F 21/552 |
| 9,461,890 B1* | 10/2016 | Nair | ....................... | H04L 67/16 |
| 2005/0257062 A1* | 11/2005 | Ignatius | .............. | G06F 21/6209 713/176 |
| 2006/0004819 A1* | 1/2006 | Claudatos | ......... | G06F 17/30085 |
| 2008/0071726 A1* | 3/2008 | Nair | .................. | G06F 17/30115 |
| 2008/0071908 A1* | 3/2008 | Nair | .................. | G06F 17/30115 709/226 |
| 2009/0182777 A1* | 7/2009 | Bolik | ..................... | G06Q 10/00 |
| 2012/0317655 A1* | 12/2012 | Zhang | ................ | G06F 21/6218 726/28 |
| 2013/0060901 A1* | 3/2013 | Adrovic | .............. | H04L 41/0654 709/217 |
| 2013/0238561 A1* | 9/2013 | Subramaniam | ..... | G06F 21/6227 707/647 |
| 2014/0244311 A1* | 8/2014 | Dawson | ............. | G06Q 10/0635 705/4 |
| 2015/0227435 A1* | 8/2015 | Ashutosh | ............ | G06F 11/1451 711/162 |

* cited by examiner

- Seven different ways to protect one LUN
  - Array-based snapshot  A->B
  - Array-based clone  A->C
  - ProtectPoint snapshot  A->D->E
  - Array-based replication (SRDF/R2)  A->F
  - Array-based replicated snapshot (SRDF/snap R2)  A->F->G
  - Array-based replicated ProtectPoint snapshot  A->F->G->H->I
  - Protection storage replication (D+E)->(J+K), (H+I)->(J+K)

- Objectives (SLOs) used to choose between the seven

FIG. 5B

- Copy Location
  - Specifies where the copy should or should not be made
  - Values: Same, Different, Specific, Anywhere but

- Space efficiency
  - Whether the copy should be space efficient
  - Values: Yes, No

- Copy Independence
  - How independent is the data copy from the primary storage
  - Values: Dependent, Independent

- Long-term protection storage
  - Does the data copy belong on long-term protection storage
  - Values: Yes, No

- Lag
  - How long does it take to get access to a data copy
  - Values: Instantaneous, Near-line, Offline

FIG. 5C

| Location | Space Efficiency | Copy Independence | Long term | Lag | Result | Technology |
|---|---|---|---|---|---|---|
| Same | Yes | No | No | Instantaneous | B | Snap |
| Same | No | Yes | No | Instantaneous | C | Sync clone |
| Same | Yes | Yes | Yes | Nearline | E | ProtectPoint |
| Specific - Site B | No | Yes | No | Instantaneous | F | SRDF R1/R2 cloning |
| Specific - Site B | Yes | Yes | No | Instantaneous | G | SRDF snap of R2 |
| Different | Yes | Yes | Yes | Nearline | I | SRDF |
| Specific - Site C | Yes | Yes | Yes | Nearline | K | ProtectPoint followed by DD replication |

FIG. 5D

Application = SQL database
Size = 100 KB
SourceStorageType = DAS
RPO = 1 day
RTO = 1 day
DCO = application consistent
Copies = 1 or more
Retention = 7 years
Locality = Remote
CloudAvailable = yes
TapeAvailable = no

FIG. 7A

☐ R6 fires and HardwareAccelleration = false

☐ R7 fires and BackupType = full

☐ R8 fires and UseCloud = true

☐ R2 fires and selects the operation

FIG. 7C

R1: if (Application = SQL Database) and
        (Locality = Remote) and
        (UseTape = true) and
        (BackupType = full) and
        (HardwareAccelleration = true) then
                perform FullBackupWithRolloverToTape
                exit
R2: if (Application = SQL Database) and
        (Locality = Remote) and
        (UseCloud = true) and
        (BackupType = full) and
        (HardwareAccelleration = true) then
                perform FullBackupWithRolloverToCloud
                exit
R3: if (Application = SQL Database) and
        (Locality = Remote) and
        (UseTape = true) and
        (BackupType = incremental) and
        (HardwareAccelleration = true) then
                perform IncrementalBackupWithRolloverToTape
                exit
R4: if (Application = SQL Database) and
        (Locality = Remote) and
        (UseCloud = true) and
        (BackupType = incremental) and
        (HardwareAccelleration = true) then
                perform IncrementalBackupWithRolloverToCloud
                exit
R5: if (Locality = Local) and
        (storage = ArrayBased) then
                Perform SnapshotBackup
                Exit R6: if (size > 1GB) and (storage = ArrayBased) then
        HardwareAccelleration = true
    Else
        HardwareAccelleration = false R7: if RPO < 1 day then
        BackupType = incremental
    Else
        BackupType = full R8: If (Retention > 5 years) and (TapeAvailable) then
        UseTape = true
    Else
        If (CloudAvailable) then
                UseCloud = true R9: if (Retention > 1 year) and (CloudAvailable) then
        UseCloud = true

FIG. 7B

OUTCOME-BASED DATA PROTECTION USING MULTIPLE DATA PROTECTION SYSTEMS

RELATED APPLICATIONS

This application is related to U.S. patent application Ser. No. 14/737,859, now U.S. Pat. No. 9,749,193, entitled "Rule-Based Systems for Outcome-Based Data Protection," filed Dec. 16, 2015, which is incorporated by reference herein in its entirety.

FIELD OF THE INVENTION

Embodiments of the present invention relate generally to data protection systems. More particularly, embodiments of the invention relate to outcome-based data protection systems.

BACKGROUND

Data storage is a critical component for computing. In a computing device, there is a storage area in the system to store data for access by the operating system and applications. In a distributed environment, additional data storage may be a separate device that the computing device has access to for regular operations. In an enterprise environment, the stored data in the storage area of the computing device or additional data storage often access one or more offsite storage devices as a part of a global disaster recover strategy to protect the entire organization by having one or more copies of data at offsite locations.

Data protection is the process of safeguarding important information or critical data from corruption and/or loss, including data backup and recovery (e.g., disaster recovery). Storage technologies that can be used to protect data include tape backup, which copies designated information to a tape cartridge device so it can be safely stored and mirroring, which creates an exact replica of a website or files so they are available from more than one place. Storage snapshots can automatically generate a set of pointers to information stored on tape or disk, allowing for faster data recovery, while continuous data protection backs up all the data in an enterprise whenever a change is made.

Current approaches to data protection rely on a data protection application be in control of all data protection actions. Using this approach, data protection is limited to the throughput and availability of a single controlling data protection application. Determination of data protection is also limited to the success or failure of data protection operations as they occur, as opposed to an expectation of what the protection of data should look like over time.

Such data protection rely upon data protection applications to be configured in precise detail relative to actions and not their outcomes. Success and failure is measured in the present—did an action, like a backup, work or not. Using the status of an action performed in the past cannot guarantee that a particular level of data protection is in place beyond the time the action was performed. And the behavior of an action cannot precisely determine the objective attempting to be met.

BRIEF DESCRIPTION OF THE DRAWINGS

Embodiments of the invention are illustrated by way of example and not limitation in the figures of the accompanying drawings in which like references indicate similar elements.

FIGS. 5A-5D are diagrams illustrating an example of a process for providing multiple data protection systems based on outcome-based service agreements according to one embodiment of the invention.

FIGS. 7A-7C are diagrams illustrating a process of a rule-based data protection system according to one embodiment of the invention.

DETAILED DESCRIPTION

Figure 1:
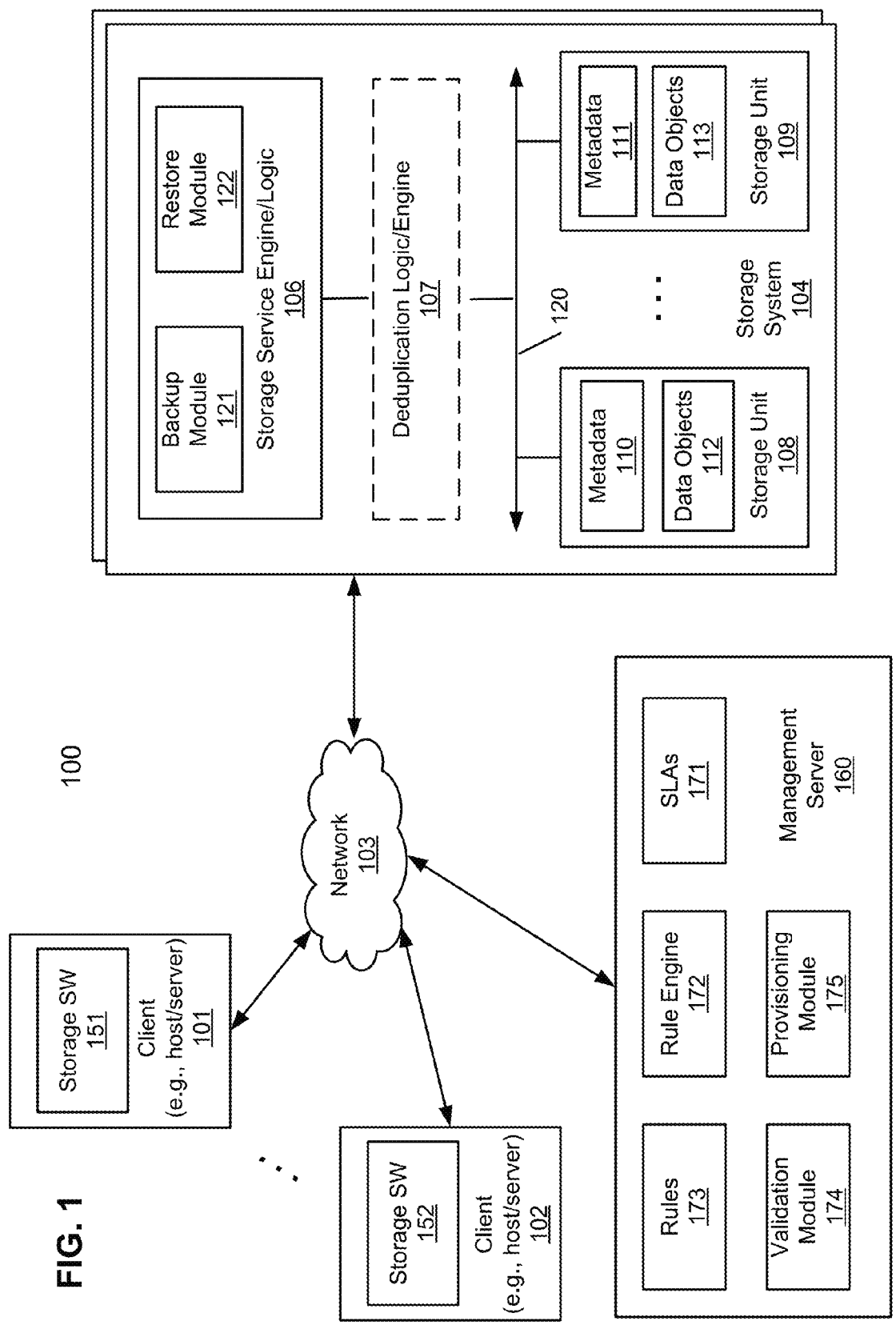
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one aspect of the invention, protecting data can be done using various methods or systems with and without the assistance of the application, host, and storage where the data is relevant. Each of these layers or entities may provide different types of protection, and taken as a whole, can meet a wide range of objectives (goals, expectations, or outcomes) relative to the protection of the data, including but not limited to locality, recoverability and application consistency. Rather than providing a single controlling data protection application that selects one or more protection technologies, according to one embodiment, an outcome-based data protection system can rely upon the artifacts, such as data copies, produced by other data protection applications or systems and compare those against a set of data protection objectives that are to be met or satisfied.

Such an outcome-based data protection system looks for the protection copies of data (e.g., an outcome), rather than the execution success or failure of a specific action performed by a data protection application, thus giving a more accurate assessment of protection of data over time. And where artifacts generated may be lost intentionally or unintentionally over time, periodic reevaluation of the set of artifacts against a set of data protection objectives (e.g., expected outcomes or goals) can be done without regard to the original execution status of a data protection application in the past.

The advantages to this new approach is two-fold—data protection can be expressed in sets of objectives to be met rather than the actions necessary to meet those objectives, and data protection can be performed by a collection of individual data protection applications that may or may not be coordinated. By simply evaluating the data being protected and the artifacts of that data protection, the system does not care about how those artifacts came to exist or when or by whom.

According to another aspect of the invention, outcome-based data protection is based on the notion that data protection can be expressed as a set of objectives or goals that need to be met over time, and that these objectives are measured against a set of artifacts relevant to the data being protected. These artifacts are generated by the execution of data protection operations initiated by one or more data protection applications. Examples of objectives include, but are not limited to, locality, numbers of copies, encryption, and retention time. Examples of artifacts include, but are not limited to, data copies and snapshots. According to one embodiment, using a rule engine to gather facts about objectives to be met and the environment in which the data to be protected lives, and then applying a set of rules that yield results relative to data protection configuration and protection activities can simplify the determination of specific data protection operations to be performed. Similarly, applying a set of rules against a set of objectives and data protection artifacts can yield a result of whether the artifacts (e.g., an outcome) satisfy the stated objectives (e.g., an expected outcome), and if not, then why.

This approach allows for the simplification of defining and monitoring the protection of data over time. Data protection is defined by a set of objectives and by simply adding more facts or rules, more precise or capable data protection schemes can be employed. The definition of objectives can have multiple uses—determination of actions to occur as well as the evaluation of artifacts for compliance with the objectives.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Any of clients 101-102 and 104 can be configured as virtualized platforms hosting one or more virtual machines to provide virtualized storage services in the cloud. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102.

Storage system 104 may include or represent any type of servers or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, storage service engine 106 (also referred to as service logic, service module, or service unit, which may be implemented in software, hardware, or a combination thereof), optional deduplication logic 107, and one or more storage units or devices 108-109 communicatively coupled to each other. Storage service engine 106 may represent any storage service related components configured or adapted to provide storage services (e.g., storage as a service) to a variety of clients using any of the access protocols set forth above. For example, storage service engine 106 may include backup logic 121 and restore logic 122. Backup logic 121 is configured to receive and back up or replicate data from a client (e.g., clients 101-102) and to store the backup data in any one or more of storage units 108-109. Restore logic 122 is configured to retrieve and restore backup data from any one or more of storage units 108-109 back to a client (e.g., clients 101-102).

In response to a data file to be stored in storage units 108-109, according to one embodiment, deduplication logic 107 is configured to segment the data file into multiple segments (also referred to as chunks) according to a variety of segmentation policies or rules. Deduplication logic 107 may choose not to store a segment in a storage unit if the segment has been previously stored in the storage unit. In the event that deduplication logic 107 chooses not to store the segment in the storage unit, it stores metadata enabling the reconstruction of the file using the previously stored segment. As a result, segments of data files are stored in a deduplicated manner, either within each of storage units 108-109 or across at least some of storage units 108-109. The metadata, such as metadata 110-111, may be stored in at least some of storage units 108-109, such that files can be accessed independent of another storage unit. Metadata of each storage unit includes enough information to provide access to the files it contains.

A deduplication key uniquely identifies a data block by storing information (such as logical address, physical address) of the data block. Deduplication logic 107 identifies data blocks that can potentially be deduplicated by comparing digests of data blocks with list of digests stored in the index table. Further, when data blocks are deduplicated after comparing digest information, deduplication logic 107 updates metadata of deduplicated data blocks. Additionally, deduplication logic 107 updates metadata of a data block when the data block is reduplicated.

Storage units 108-109 may be implemented locally (e.g., single node operating environment) or remotely (e.g., multi-node operating environment) via interconnect 120, which may be a bus and/or a network (e.g., a storage network or a network similar to network 103). Storage units 108-109 may include a single storage device such as a hard disk, a tape drive, a semiconductor memory, multiple storage devices such as a redundant array system (e.g., a redundant array of independent disks (RAID)), a system for storage such as a library system or network attached storage system, or any other appropriate storage device or system. Some of storage units 108-109 may be located locally or remotely accessible over a network.

In one embodiment, referring back to FIG. 1, any of clients 101-102 may further include storage software 151-152, which may include similar components as of storage system 104, such as deduplication logic having at least a portion of functionalities of deduplication logic 107. Storage software 151-152 may be configured to perform local deduplication operations, respectively. For example, prior to transmit data to storage system 104, each of the deduplication logic of storage software 151-152 may deduplicate the data into deduplicated segments and determine whether a particular deduplicated segment has already been stored in storage system 104. A deduplicated segment is transmitted to storage system 104 only if the deduplicated segment has not been stored in storage system 104.

For example, when client 101 is about to transmit a data stream (e.g., a file or a directory of one or more files) to storage system 104, the deduplication logic of storage software 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, clients 101-102 and/or storage system 104 may further include a storage manager or storage controller (not shown) configured to manage storage resources of the storage systems, such as, for example, storage space and processing resources (e.g., processor, memory, network resources). The storage manager or controller may be accessed by an administrator of management console or server 160 remotely via a management or configuration interface (not shown). The administrator can provision and manage storage resources based on a set of policies, rules, and/or service level agreements (SLAs). The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (VMs) (e.g., virtual storage systems) managed by one or more virtual machine managers (VMMs). Each of the virtual machines can be provisioned to provide a particular type of storage services (e.g., file-based, block-based, object-based, or HDFS) to a client based on a storage policy or service level agreement associated with that particular client as part of software-defined storage services.

According to one embodiment, management server 160 includes a user interface (e.g., Web interface) and/or an application programming interface (API), not shown, to allow a user or administrator to set up or configure a service level agreement (SLA) of data protection (also referred to as a data protection plan or DPP) as part of SLAs 171. Each of SLA includes one or more service level objectives (SLOs), also referred to as data protection objectives or DPOs, which specify one or more objectives of one or more data protection methods or systems to be met (e.g., expected data protection goal or outcome). That is, an SLA refers to a collection of SLOs or DPOs. An SLO or DPO refers to something to be provided in a particular context that is measurable and quantifiable. An SLO or DPO may specify the data to be protected (e.g., source) and a type of data protection (e.g., archive, backup, replication, deduplication, migration) for a specific time period. An SLA may include multiple SLOs that may require multiple data protection methods or systems to be involved.

In one embodiment, through a user interface, a user or administrator can identify a particular source for data protection, such as, for example, client 101. In response, one or more data protection methods or systems are identified based on the SLOs of an SLA associated with the source. In one embodiment, management server 160 may include a discovery module (not shown) that is configured to communicate with all the storage systems (e.g., storage systems 104 and 102 in this example) to identify any possible storage systems that are capable of providing data protection and the types of data protection to client 101 in this example. The identified data protection methods and systems are presented to the user for selection. Alternatively, the data protection methods or systems may be automatically selected based on the SLA.

Based on the selected data protection methods, a list of actions is identified, which may include one or more of archiving, backup, replication, migration, or deduplication, etc. The list of actions when performed collectively intends to satisfy the objectives specified in the SLA. Based on the list of actions, provisioning module 175 is configured to communicate with the systems that are capable of providing data protection to the source to provision (e.g., select, allocate) the corresponding services (e.g., archive service, backup service, replication service, deduplication service) to carry out the actions.

For example, provisioning module 175 may provision an archive service at system 101 (e.g., first storage system) to archive and/or deduplicate data for its local clients, a backup service on systems 101 and 102 (e.g., second storage system) to backup and/or deduplicate data from system 101, and a replication service on systems 102 and 104 (e.g., third storage system) to replicate data from system 102, etc. In this embodiment, multiple data protection methods or systems can be utilized to provide data protection that is specified in one or more SLOs of the corresponding SLA.

According to one embodiment, rule engine 172 is utilized to examine the SLAs 171 by applying a set of rules 173 to determine a list of actions to be performed in order to achieve the SLOs of SLAs 171. After the actions have been performed by the associated data protection systems, validation module 174 is configured to communicate with the system to examine an outcome or outcomes of the data protection methods in view of the SLOs of the SLAs 171 to determine or verify whether the objectives have been achieved or satisfied. That is, validation module 174 does not need to know or concern how the data protection methods are performed and by which systems. Rather, validation module 174 verifies whether the data protection objectives have been met based on the outcome of the data protection methods.

Figure 2:
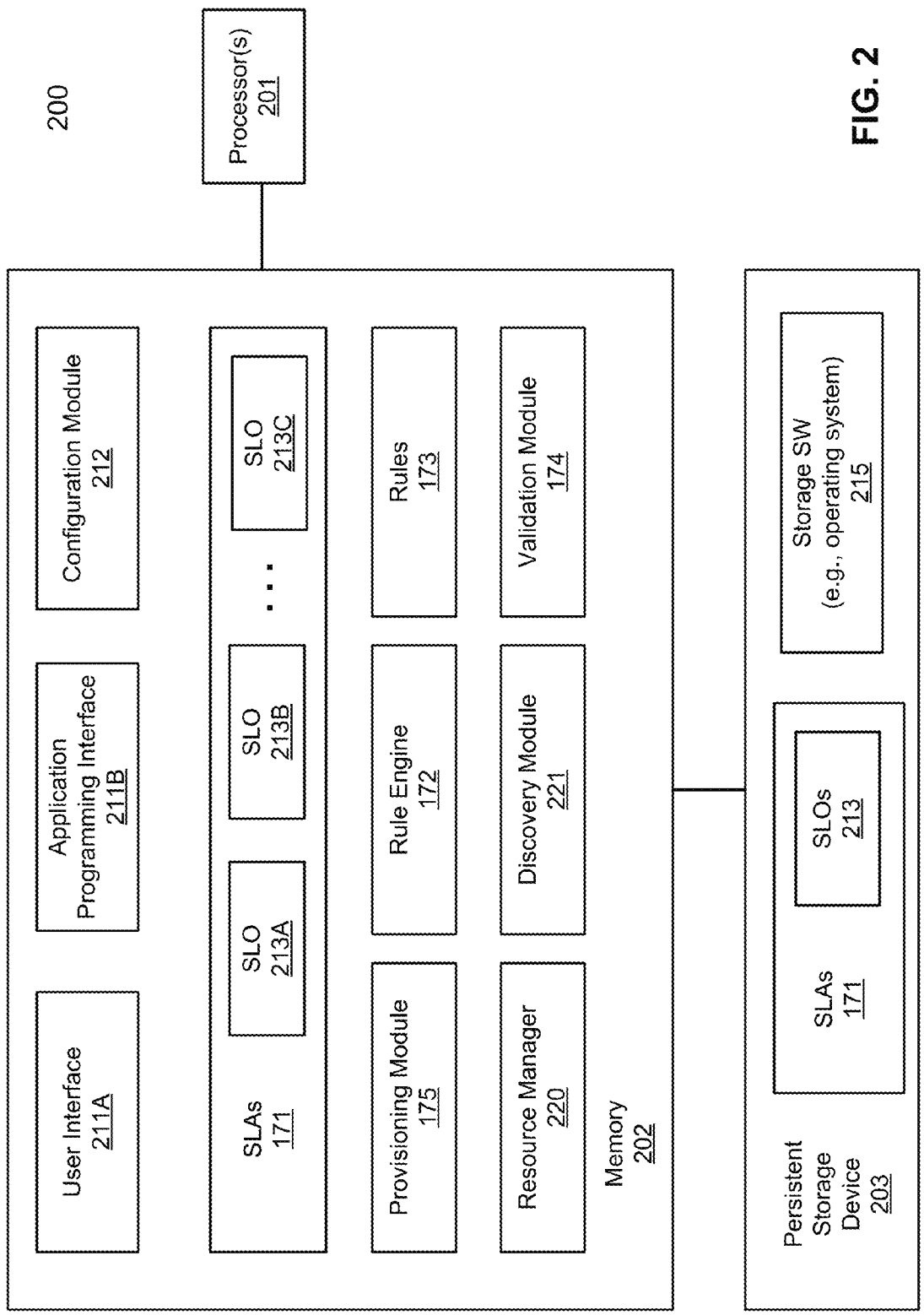
FIG. 2 is a block diagram illustrating an example of a storage management system according to one embodiment of the invention.

FIG. 2 is a block diagram illustrating an example of a storage management system according to one embodiment of the invention. For example, system 200 may represent management server 160 of FIG. 1. Referring to FIG. 2, system 200 includes, but is not limited to, user interface 211, configuration module 212, rule engine 172, provisioning module 175, and validation module 174 loaded into memory 202 (e.g., volatile storage such as system memory) and executed by processing resources such as one or more processors 201. The components loaded into memory 202 may be part of storage software 215 stored in persistent storage device 203 (e.g., non-volatile storage such as a hard disk or flash memory device).

In one embodiment, system 200 may be a Web server or a cloud server that is accessible over the Internet from any of the devices that are capable of connecting with the Internet using a browser application. Similarly, user interface 211 may be presented as a Web interface, for example, in a form of Web pages to allow a user or administrator to configure or set up an SLA and specify one or more SLOs of the SLA. In response to the user interactions, configuration module 212 configures SLAs 171 having a variety of SLOs 213A-213C. The SLA 171 may be configured based on a uniformly provided template or templates, dependent upon the specific user requests. SLA 171 configured in memory 202 may be stored in persistent storage device 203 or a database that is accessible by system 200.

Subsequently, a user, which may or may not be the same user who configured the SLAs 171, can request data protection on a particular resource (e.g., a file, a directory of files, a file system, a storage volume, application data, computer, federation of computers and/or applications, or entire data processing system) through user interface 211A and/or API 211B. For example, the user can select or click a graphical representation (e.g., icon) representing the resource to be protected. As described above, system 200 may include a discovery module 221 that is configured to periodically discover any resources present or available from a variety of systems in a predefined network community (e.g., a private cloud). The available resources may be discovered from the resources providers as a pool of resources and presented in a form of catalogs corresponding to a variety of data protection services, such as, for example, archive, deduplication, backup, replication, migration, etc.

In one embodiment, the user can select any of SLAs 171 for data protection for the particular resource as a source. In response to the user selection of an SLA to be applied to the resource to be protected, a list of actions required to be performed is identified in view of the SLOs of the selected SLA. In one embodiment, rule engine 172 applies set of rules 173 to the selected SLA to derive a list of actions to be performed. Based on the list of actions, a list of one or more data protection service options is identified from the pool of available resources. The data protection service options may be presented to the user for selection. Alternatively, one or more data protection service options may be automatically selected.

Once a data protection option has been selected, a set of one or more data protection services may be identified and selected from the pool of resources, provisioning module 175 communicates with and provisions the corresponding system(s) that provide those resources or data protection services based on the SLOs of the corresponding SLA. In one embodiment, provisioning module 175 sends a command or request to the corresponding resource manager(s) 220 including information or metadata describing the data protection services and how the data protection services should be configured and operate. A provisioning counterpart module at those systems in turn configures the proper services to be performed, for example, at a particular date and time for a specified period of time using a particular data protection method or protocol, etc., which may be specified by the SLOs of the SLA.

Once the data protection services have been performed by one or more data protection systems, validation module 174 examines an outcome of each of the data protection services in view of the associated SLOs to determine whether the objectives specified by the SLOs have been met. In one embodiment, validation module 174 communicates with a source storage system to determine who provided the data protection services to its data. Validation module 174 then communicates with those data protection systems to examine the outcome of the data protection services in view of the SLOs of the corresponding SLA to determine whether the objectives specified in the SLOs have been achieved. For example, validation module 174 communicates with the systems that performed the data protection services to receive operating statistics data or metadata of the protected data to verify whether the protected data is indeed received from the source, whether the services were performed according to the schedule specified by the corresponding SLO, and whether the data has been transmitted or received according to the proper protocol as specified by the SLO, etc.

Figure 3A:
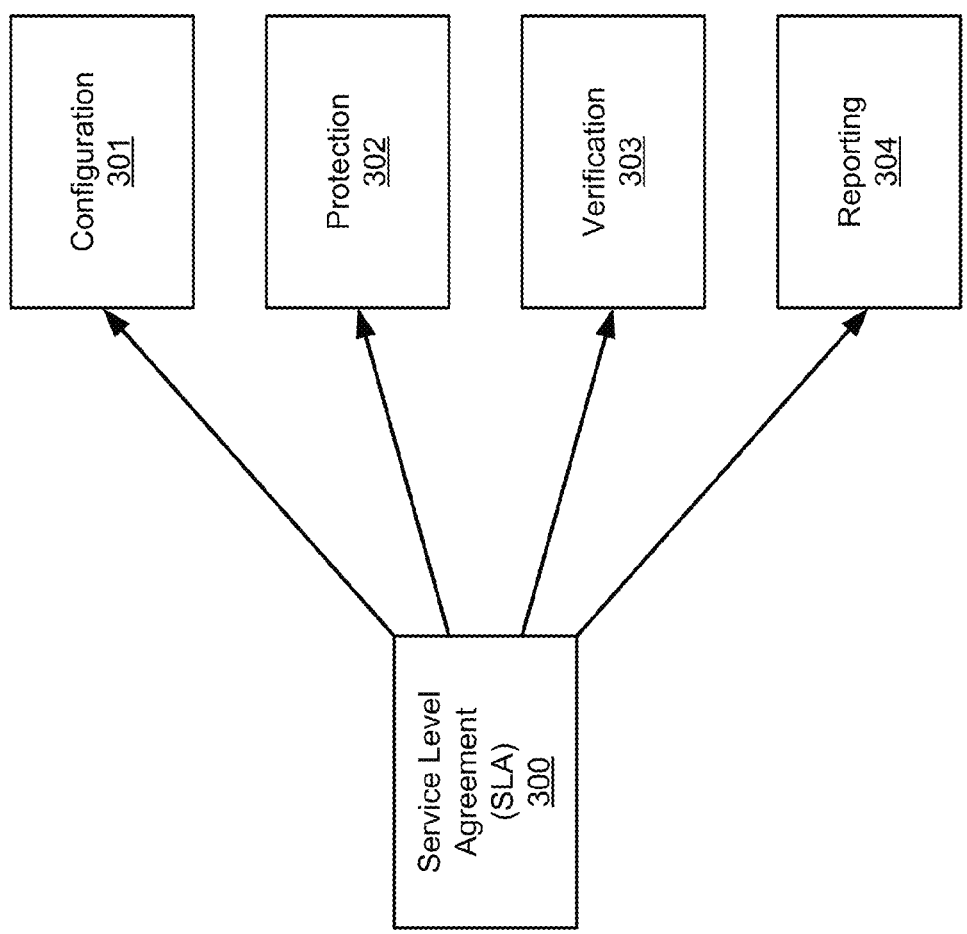
FIG. 3A shows data protection phases driven by a service level agreement according to one embodiment of the invention.
Figure 3B:
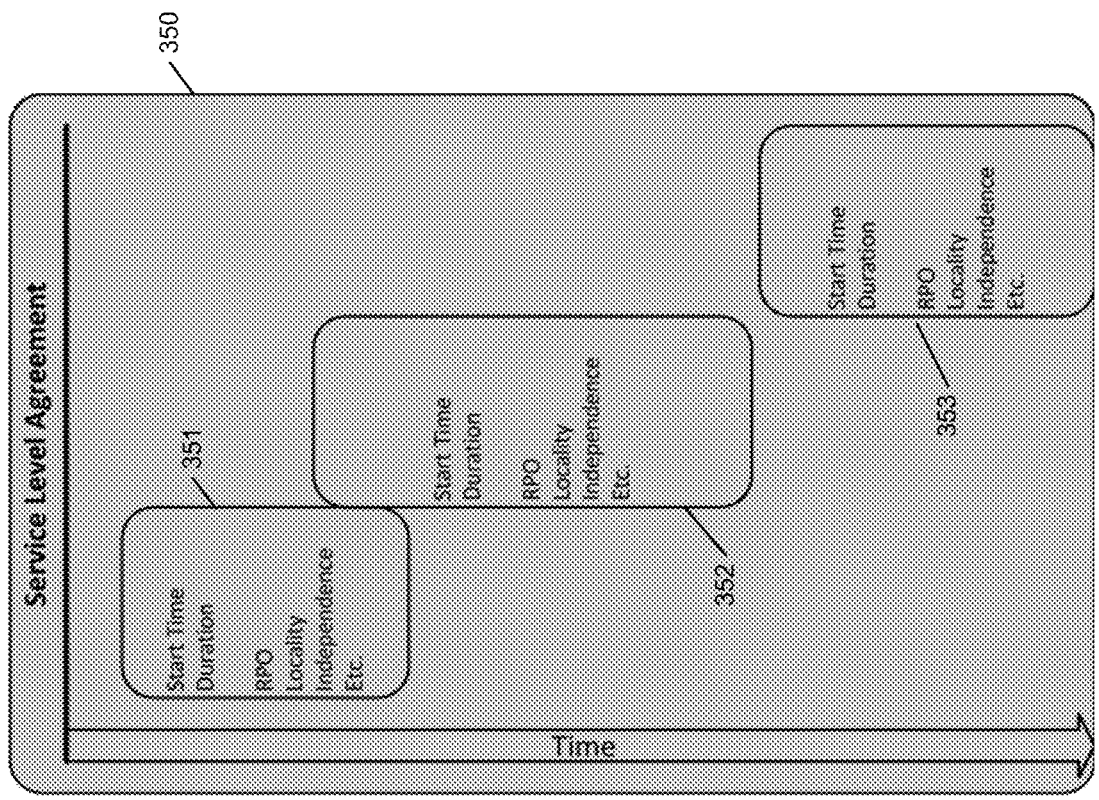
FIG. 3B shows an example of a service level agreement for data protection according to one embodiment of the invention.

Thus, an SLA or data protection plan is used to drive or govern different stages or phases of a data protection processing workflow, including configuration phase, protection phase, and verification phase, etc., as shown in FIG. 3A. Referring to FIG. 3A, according to one embodiment, a data protection workflow includes configuration phase 301, protection phase 302, verification phase 303, and optional reporting phase 304. Each of the phases 301-304 is driven based on SLA 300. During configuration phase 301, processing logic specifies what needs to be established in order to protect a particular resource, provisions required protection resources, and guides users to complete the actions. During the protection phase 302, the actual protection operations are performed according to the manner specified by the SLOs. During verification phase 303, processing logic verify the outcome of the data protection operations to ensure existing data protection artifacts meet the defined objectives in the SLOs. During the optional reporting phase 304, information about the verification phase can be combined with other business data to provide additional information of value, such as billing and contractual adherence reports. FIG. 3B is a block diagram illustrating an example of an SLA. Referring to FIG. 3B, for the purpose of illustration, SLA 350 includes SLOs 351-353 representing certain data protection services deployed at different times and durations.

Figure 4:
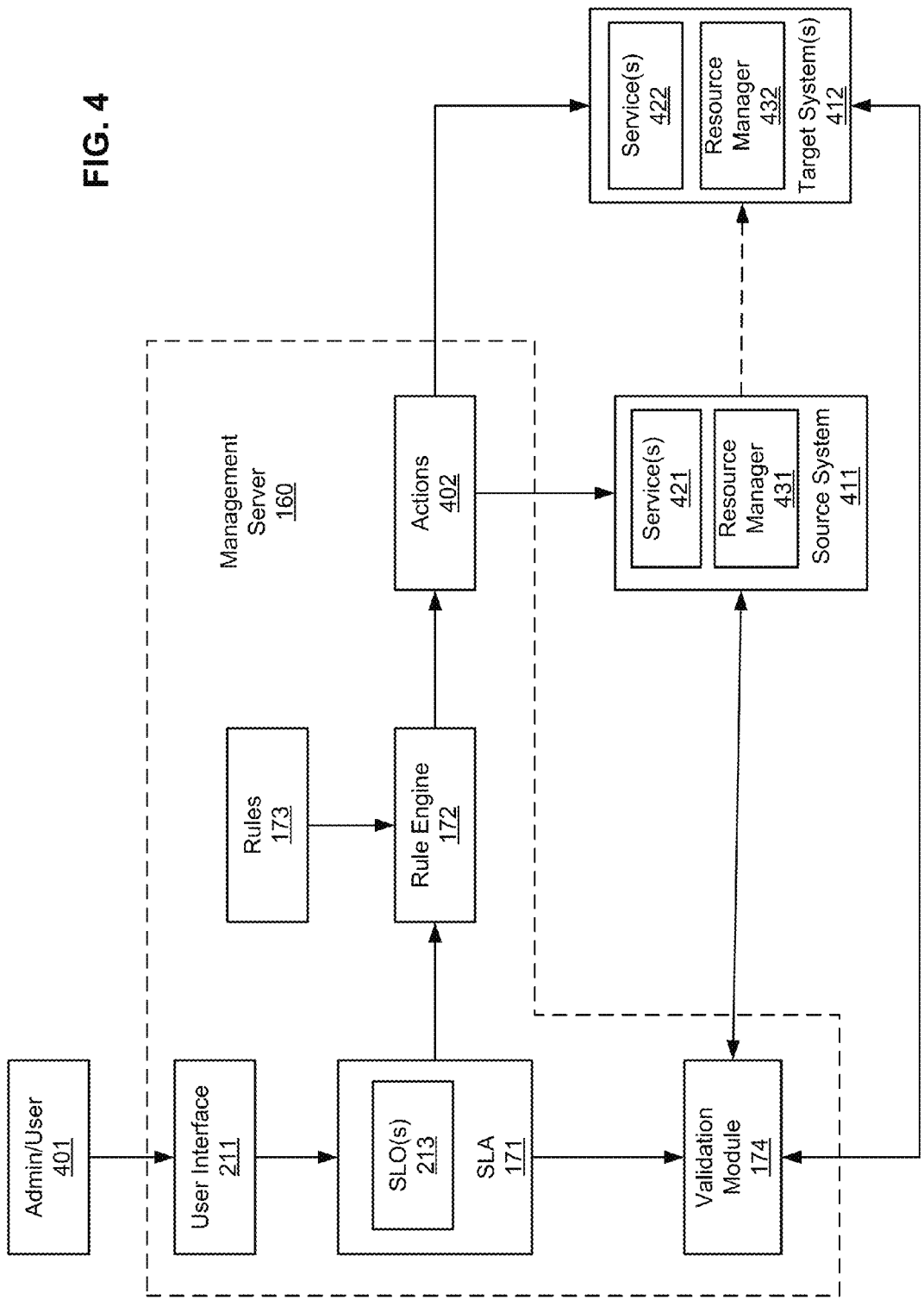
FIG. 4 is a block diagram illustrating a processing flow of providing outcome-based data protection according to one embodiment of the invention.

FIG. 4 is a block diagram illustrating a processing flow of providing outcome-based data protection according to one embodiment of the invention. Referring to FIG. 4, administrator or user 401 sets up SLA 171 having one or more SLOs 213 specified therein via user interface 211. The SLOs 213 of SLA 171 are used by rule engine 172 (also referred to as an influence engine) by applying a set of rules 173 to determine a list of actions 402. According to one embodiment, a forward chaining algorithm is utilized to derive list of actions 402 based on SLA 171. Forward chaining starts with the available data and uses inference rules to extract more data (from an end user, for example) until a goal is reached. An inference engine using forward chaining searches the inference rules until it finds one where the antecedent (If clause) is known to be true. When such a rule is found, the engine can conclude, or infer, the consequent (Then clause), resulting in the addition of new information to its data.

Actions 402 are then deployed in a form of data protection services 421-422 (e.g., archive, deduplication, backup, replication, or migration), for example, in storage system 411 and storage system 412. For example, user 401 may want to back up data stored in storage system 411 to storage system 412 with deduplication. As a result, services 421 may include a backup service while services 422 may include an archive service and a deduplication service, which may be allocated and provisioned from a pool of storage resources that have been advertised by storage systems 411-412 and discovered by a discovery module of management server 160. After the data protection operations have been completed, validation module 174 communicates with storage systems 411-412 to communicate with resource managers 431-432 of source and target systems 411-412, respectively, to examine the outcome of the protection operations in view of SLA 171 to determine whether the objectives of SLOs 213 have been achieved.

In one embodiment, the verification may also be performed using a backward chaining algorithm. Backward chaining starts with a list of goals (or a hypothesis) and works backwards from the consequent to the antecedent to see if there is data available that will support any of these consequents. An inference engine using backward chaining would search the inference rules until it finds one which has a consequent (Then clause) that matches a desired goal. If the antecedent (If clause) of that rule is not known to be true, then it is added to the list of goals (in order for one's goal to be confirmed one must also provide data that confirms this new rule). For example, if an objective to be met is having a data copy every day for 7 days, then that objective is the goal to be supported. If there are no other goals to be supported, the system can be interrogated for the list of copies to evaluate if the list contains a copy every days for the 7 days required. If that list supports the goal, then the goal is met.

Figure 5A:
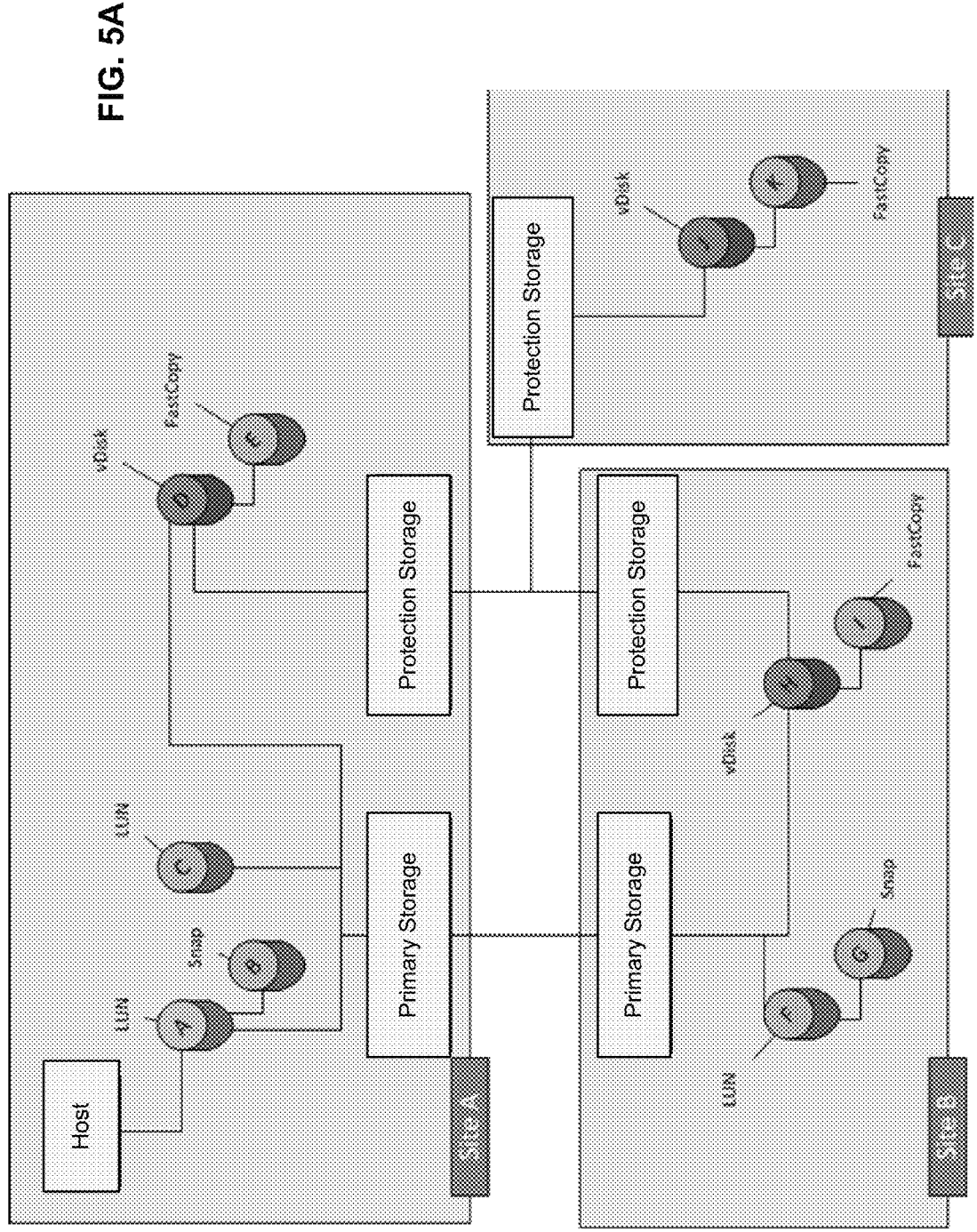

FIGS. 5A-5D are diagrams illustrating an example of a process for providing multiple data protection systems based on outcome-based service agreements according to one embodiment of the invention. Referring to FIG. 5A, data of logical unit or volume LUN A can be protected by a variety of data protection methods, either locally within site A or by other sites B and/or C. In this example, there are 7 ways to protect LUN A as shown in FIG. 5B: 1) snapshot of A into B locally, 2) clone from A to C locally, 3) replication of snapshot from A to D into E locally, 4) replication from A to F of site B, 5) replicated snapshot from A to F and then to G in site B, 6) replicated snapshot from A-F-G-H-I of site B, and 7) protected storage replication (D+E) to (J+K), (H+I) to (J+K). Dependent upon the specific SLOs selected by the user or administrator, for example as shown in FIG. 5C, some of the data protection methods or systems as shown in FIG. 5B may be selected, as shown in FIG. 5D.

In one embodiment, when a user selects a storage resource to be protected, in this example, LUN A via a user interface, the system identifies, for example, through a discovery process, data protection methods B to K that are capable of providing data protection for LUN A in various ways. A graphical representation similar to the one as shown in FIG. 5A may be presented to the user. The user can select one or more of the B to K for data protection, which in turn the system generates a list of actions and provisions the proper data protection services to be performed in proper data protection systems. Alternatively, the user can select certain SLOs and in response to the selected SLOs, the system automatically select the data protection methods corresponding to the selected SLOs and the proper data protection services are provisioned accordingly.

Figure 6:
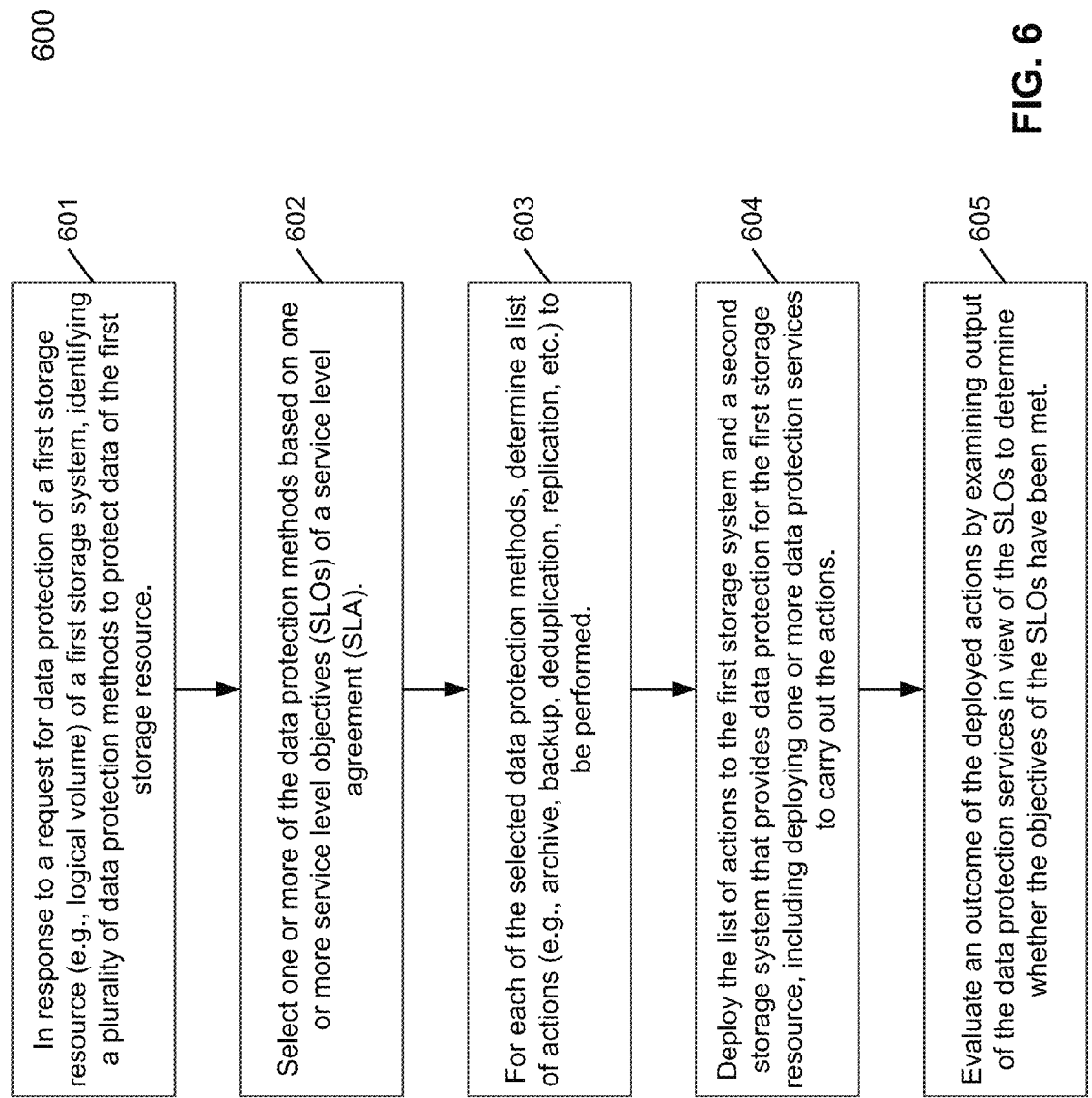
FIG. 6 is a flow diagram illustrating a process for providing multiple outcome-based data protection systems according to one embodiment of the invention.

FIG. 6 is a flow diagram illustrating a process for providing multiple outcome-based data protection systems according to one embodiment of the invention. Process 600 may be performed by processing logic which may include software, hardware, a virtual machine, or a combination thereof. For example, process 600 may be performed by management server 160 of FIG. 1. Referring to FIG. 6, at block 601, in response to a request for data protection of a first storage resource (e.g., a file, a directory of files, a volume, a file system, a disk) of a first storage system, processing logic identifies multiple data protection methods that are able to protect the first storage resource. At block 602, processing selects one or more of the data protection methods based on one or more SLOs of an SLA. At block 603, for each of the selected data protection methods, processing logic determines a list of actions (e.g., archive, backup, deduplication, replication, migration, etc.) to be performed. At block 604, the list of actions are deployed as data protection services in a data protection system, such as a second storage system that provides data protection for the first storage system. At block 605, processing logic evaluates an outcome of the deployed actions by examining the output data in view of the SLOs to determine whether the objectives specified in the SLOs have been met.

FIGS. 7A-7C are diagrams illustrating a process of a rule-based data protection system according to one embodiment of the invention. Referring to FIG. 7A, FIG. 7A shows an example of an SLA including various SLOs that specify the requirements or objectives of the data protection. In this example, the SLA can include zero or mode SLO's such as, but not limited to, recovery point objective (RPO), data consistent objective (DCO), desired retention period, and locality, etc. All of these objectives may affect how the data protection systems are selected, because different storage systems may be equipped with different storage resources that can provide different types of data protection.

For example, a storage system that is located locally with respect to the source may not be selected because the locality objective indicates that the user wants the data to be protected by a remote system. Similarly, if a particular storage system has been configured to only store data with a size that is greater than 10 megabytes (MB), such a storage system may not be selected because one of the objectives of the SLA indicates that the size of the data to be protected is only 100 kilobytes (KB).

According to one embodiment, a set of rules such as rules as shown in FIG. 7B is applied to the SLA as shown in FIG. 7A. Some of the rules may or may not be applied dependent upon whether the objectives or parameters of the SLA meet the conditions set forth in the rules. As described above, a forward chaining algorithm is utilized to go through each of the rules to derive a final rule or rules to be utilized. In this example, since the size of the data to be protected is 100 KB, when rule R6 is applied, the result would be "hardware acceleration"=false. Another word, a system with hardware acceleration feature will not be selected. When rule R7 is applied, since the RPO objective requires 1 day, the backup type has to be a full backup. As a result, the list of actions derived will indicate that the backup to be performed will be a full backup. When rule R8 is applied, since the SLA indicates 1) retention=7 years, 2) cloud available=yes; and 3) no tape to be used, the cloud backup is used. Based on the results of rules R6, R7, and R8 applied to the SLOs of the SLA shown in FIG. 7A, rule R2 is finally applied that satisfies all of the requirements set forth in the results of rules R6 to R8. Based on rule R2, proper storage resources may then be provisioned to perform the necessary data protection actions.

Figure 8:
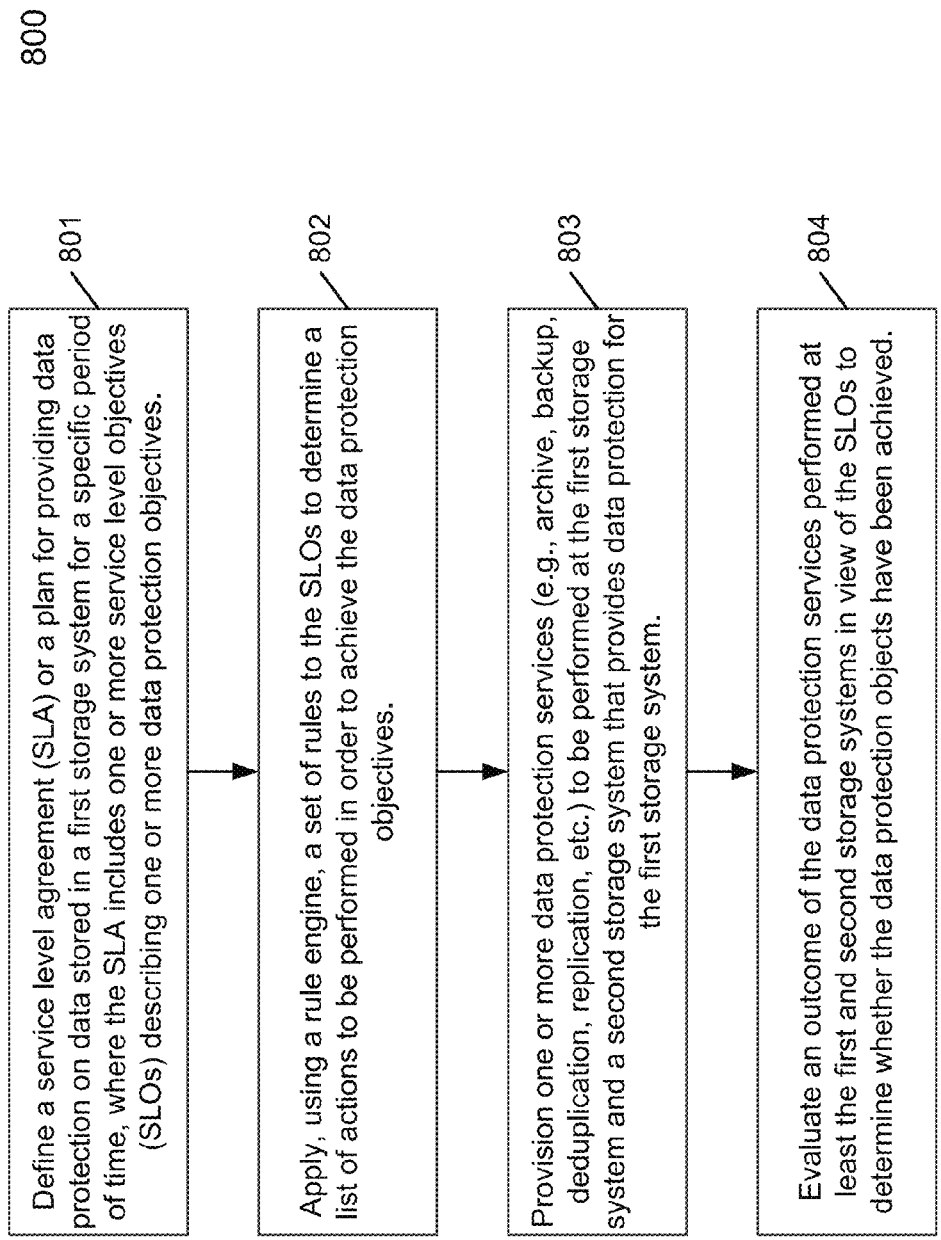
FIG. 8 is a flow diagram illustrating a process for providing rule-based outcome-based data protection systems according to one embodiment of the invention.

FIG. 8 is a flow diagram illustrating a process for providing rule-based outcome-based data protection systems according to one embodiment of the invention. Process 800 may be performed by processing logic which may include software, hardware, a virtual machine, or a combination thereof. For example, process 800 may be performed by management server 160 of FIG. 1. Referring to FIG. 8, at block 801, processing logic defines an SLA or a data protection plan for providing data protection on data stored in a first storage system for a specific period of time (e.g., start time and duration). The SLA includes one or more SLOs describing one or more data protection objectives. The SLA may be configured in response to user inputs through a user interface. At block 802, a rule engine applies a set of rules to the SLOs of the SLA to determine a list of actions to be performed to achieve the data protection objectives set forth in the SLA. The set of rules may be applied using a forward chaining method. At block 803, processing logic provisions one or more data protection services (e.g., archive, backup, deduplication, replication, migration) to be performed at the first storage system and an optional second storage system. At block 804, processing logic evaluates an outcome of the data protection services in view of the SLOs to determine whether the data protection objectives have been achieved. In one embodiment, the evaluation may be performed using a backward chaining method based on the rules.

Note that the techniques described throughout this application can be applied to a variety of data protection methods, such as data deduplication and data replication, etc. Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

Data deduplication can operate at a file or a block level. File deduplication eliminates duplicate files (as in the example above), but block deduplication processes blocks within a file and saves unique copy of each block. For example, if only a few bytes of a document or presentation or a file are changed, only the changed blocks are saved. The changes made to few bytes of the document or the presentation or the file do not constitute an entirely new file. The sharing of file system data blocks conserves data storage for storing files in a data storage system. The snapshot copy facility is a space saving technology that enables sharing of file system data blocks among versions of a file. On the other hand, a deduplication facility enables the sharing of file system data blocks within a file, among versions of a file, between versions of a file and unrelated files, and among unrelated files. Therefore, the deduplication facility eliminates from the data storage system any file system data blocks containing duplicative data content.

Deduplication of data happens in two logically distinct operations: detection and remapping. The detection operation identifies blocks containing the same data. The remapping operation updates address maps that record physical locations of logical units (LUNs) of data so that a single block of data is shared by multiple LUNs or by multiple positions within the same LUN. Detection is accomplished by building a database (e.g., index table) that maintains a digest (e.g., SHA, checksum) and, a deduplication key for each data block. When two data blocks have the same digest they have a sufficiently high probability of containing the same data to warrant a bit-for-bit comparison to confirm they are exact duplicates.

A goal of deduplication logic 107 is to maintain only a single copy of each unique set of data within a data set. To achieve that goal, deduplication logic 107 finds data blocks that have not been deduplicated and processes data blocks for deduplication by computing digests for data blocks. A digest is a representation of contents stored in a data block. Further, the digest is mathematically computed (e.g., MD5, SHA-1, SHA-2) in such a way that, computationally, there is a very low or zero probability of finding two data blocks that have the same digest but different contents. If the digest for the data block is sent together with the data block, a recipient of the data block can compute a new digest from the received data block and can compare the new digest with the received digest to determine whether the received data block is valid. Additionally, a digest is stored in an index table in order to process data blocks within the data set for deduplication. Further, a deduplication key identifying a data block is also stored in index table along with the digest for the data block.

A replicator replicates an original file system on a replicated file system. The replicated file system can be accessed by both the replicator and clients. To perform file replication, the replicator may create, delete or modify files on the replicated file system. In some embodiments, clients can read files on the replicated file system, but may not create, delete or modify files. In some embodiments, the replicator duplicates the replicated file system based on the original file system during initialization. In some embodiments, to efficiently initialize the replicated file system, the original file system is copied to the replicated file system via a network connection or using removable storage media such as backup tapes or optical storage discs.

In some embodiments, data segments included in the original file system are copied to the replicated file system via removable storage media and initialization is completed via the network. The replicator updates changes to the original file system on the replicated file system, keeping the two file systems synchronized. The replicator may be implemented as a process and/or device separate from the storage systems and/or file systems, a process and/or device that is a part of one or both of the storage systems and/or file system, or any other appropriate means. For example, in some embodiments, the replicator is a standalone device capable of communicating with the file systems. It determines the necessary updates by communicating with the original file system, and sends the updates to the replicated file system. The replicated file system is configured to answer queries, accept the updates, and modify the contents in the file system accordingly. In some embodiments, the replicator's functions are implemented as separate processes on the storage systems.

It is possible to represent files in other ways, such as using a mixture of byte sequences and references to byte sequences in other files. The byte sequences are treated as data segment. The identifiers used to reference the segments are substantially shorter than the segments themselves. Therefore, using identifiers allows more efficient use of available storage space. In some embodiments, the data segments and data segment identifiers are replicated on the replicated file system. In some embodiments, metadata of files are also updated. As used herein, metadata includes data associated with various attributes of the file, such as file name, file length, date stamp, permission, whether a file has been removed from the current file system, whether a file has been renamed, etc.

In some embodiment, only the files that have been updated or newly references are replicated. A file is deemed to have been updated if it has been modified in some way since the last replication, such as having been edited, created, renamed, deleted, had a permission change, etc. If the file has not been updated, nothing needs to be done to it in terms of replication. Any data segment that has been previously stored on the replicated file system, but is newly referenced by the file being processed is located. In some embodiments, a data segment is deemed to be newly referenced if it was not referenced by the file at the time of the last replication, as a data segment that has been added or modified since the last replication.

In some embodiments, a data segment is deemed to be newly referenced if it was never referenced by the file during the file's replication history, or was not referenced within some number of replications. A data segment may be previously stored on the replicated file system, but is still newly referenced by the file if the data segment was previously stored on the replicated file system by another file, by a client writing to the replicated file system, or by some other preloading/initialization mechanism. Since the data segments have been previously stored, they do not need to be replicated again on the replicated file system. Thus, greater efficiency in replication is achieved, especially in file systems where multiple files share a large amount of identical data. How to locate these previously stored data segments are discussed in more detail below. Further, data segments that have not been previously stored on the replicated file system are located and replicated on the replicated file system. It is possible in some situations that all the data segments included in the file have been previously stored on the replicated file system therefore no additional replication is necessary. It is also possible that there is no previously stored data segment and all the data segments in the file need to be replicated.

In some embodiments, a log record is used to track the file system operations, recording file updates as they occur. Depending on implementation, the entries in the log record may include segment references, content handles, metadata, and other information that can be used for executing operations to synchronize the replicated file system with the original file system. There are a number of ways a log entry is generated, including every time an event (such as file write) occurs, after several events occur, or at a predetermined frequency. In some embodiments, to capture more update information with fewer log entries, each log entry is generated only when a key event occurs, such as when a file closes, after a predetermined idle period has lapsed, when a snapshot of the file system is created, etc. During replication, the log record is processed, and updated files are determined based on log entries indicating file update operations such as file modification, file creation, etc.

In some embodiments, a snapshot is taken immediately before a replication starts. The snapshot records information of the file system at a point in time. It may be a snapshot of the entire file system, or a snapshot of one or more individual files. The snapshot may include information such as data segment references, content handles, etc. In some embodiments, prior to the next replication operation, the current states of the system are compared to a snapshot of the system to determine which files have been updated. In some embodiments, the current states of a file are compared to a snapshot of the file to determine whether the file has been updated.

In processing data segments, there are a number of ways to locate data segments that have not been stored previously on the replicated file system, some of which are described below although any other appropriate technique may be used. In some embodiments, log records are used. Log entries record operations on the original file system. In some embodiments, when a file is updated, a log entry including information about the file's data segment references is created. Offsets of the new data segment references, and other information that may assist in file replication are also recorded as appropriate. During replication, based on the log records of the new data segment references, it is determined whether the data segment being referenced has been stored already.

In some embodiments, upon receiving a query, the data segment reference on the replicated file system is looked up by the replicator or the replicated file system in a database of stored data segment identifiers, to determine whether such a data segment has been stored previously, and provides a response based on the lookup result. In some embodiments, the data segment reference under evaluation is compared with the data segment references known at the time of last replication. The comparison can be carried out by the original file system or by the replicator. If the data segment reference can be found in existing data segment references, it indicates that the corresponding data segment has already been stored. Else, the corresponding data segment may not have been stored and may need to be replicated. In some embodiments, all such segments are replicated. In other embodiments, a query of the replicator or replicated file system determines whether the segment is replicated or not as described above. In all cases, many segments are not replicated even though new references to those segments are. Thus, the available bandwidth of the storage systems and the network connecting them is more efficiently utilized.

In some embodiments, when a file is updated, a log entry including information about the file's content handle is created. In some embodiments, to reduce the amount of processing, a log entry including content handle information is created after multiple updates, or upon certain key event such as when a file is closed. The content handle indirectly references the data segments included in the file and may be analyzed to obtain data segment references.

Data migration is the process of transferring data between storage types, formats, or computer systems. It is a key consideration for any system implementation, upgrade, or consolidation. Data migration is usually performed programmatically to achieve an automated migration, freeing up human resources from tedious tasks. Data migration occurs for a variety of reasons, including server or storage equipment replacements, maintenance or upgrades, application migration, website consolidation and data center relocation.

To achieve an effective data migration procedure, data on the old system is mapped to the new system utilizing a design for data extraction and data loading. The design relates old data formats to the new system's formats and requirements. Programmatic data migration may involve many phases but it minimally includes data extraction where data is read from the old system and data loading where data is written to the new system.

After loading into the new system, results are subjected to data verification to determine whether data was accurately translated, is complete, and supports processes in the new system. During verification, there may be a need for a parallel run of both systems to identify areas of disparity and forestall erroneous data loss. Automated and manual data cleaning is commonly performed in migration to improve data quality, eliminate redundant or obsolete information, and match the requirements of the new system. Data migration phases (design, extraction, cleansing, load, verification) for applications of moderate to high complexity are commonly repeated several times before the new system is deployed.

Note that some or all of the components as shown and described above (e.g., components of management server 160, storage service engine 106 and/or deduplication logic 107 of FIG. 1) may be implemented in software, hardware, a virtual machine, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
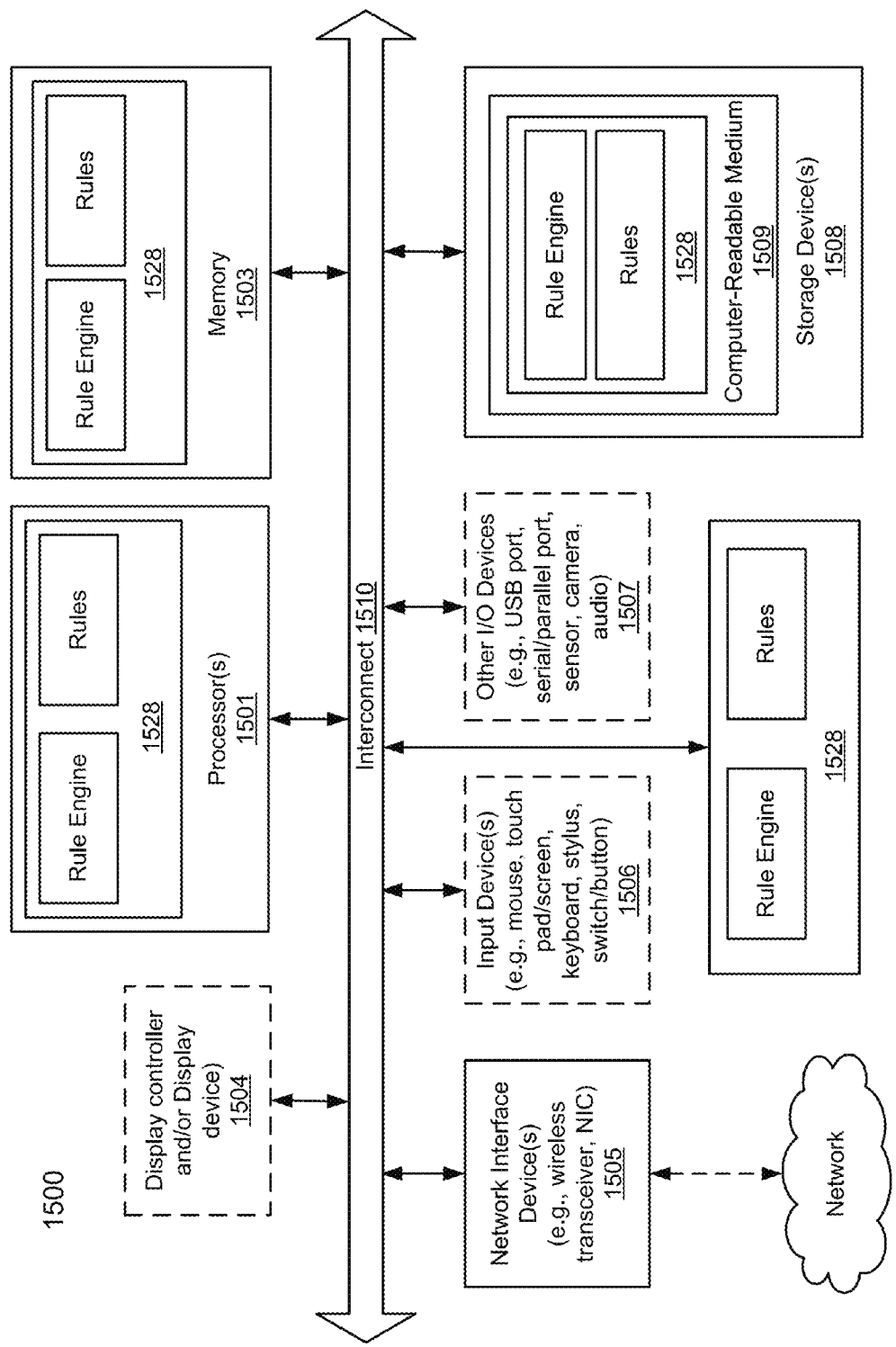
FIG. 9 is a block diagram illustrating a data processing system according to one embodiment.

FIG. 9 is a block diagram illustrating an example of a data processing system which may be used with one embodiment of the invention. For example, system 1500 may represents any of data processing systems described above (e.g., clients 101-102, storage system 104, or management server 160 of FIG. 1) performing any of the processes or methods described above. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC).

The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Module/unit/logic 1528 may also reside, completely or at least partially, within memory 1503 and/or within processor 1501 during execution thereof by data processing system 1500, memory 1503 and processor 1501 also constituting machine-accessible storage media. Module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1528, components and other features described herein can be implemented as discrete hardware components or integrated in the functionality of hardware components such as ASICS, FPGAs, DSPs or similar devices. In addition, module/unit/logic 1528 can be implemented as firmware or functional circuitry within hardware devices. Further, module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing data protection of a data processing system, comprising:
   in response to a request for data protection of a first resource of a first system of a first site, identifying a plurality of data protection methods that are available to provide data protection for the first resource, wherein the plurality of data protection methods include at least in part replication of the first resource from the first system of the first site into a second resource of a second system of a second site, and replication of the first resource into the second resource and subsequently replication of a snapshot of the second resource into a third resource of the second system of the second site;
   selecting one or more of the data protection methods based on one or more data protection objectives of a data protection plan that is associated with the first resource, wherein the data protection objectives include space efficiency indicating whether data copy is to include previously stored data segments from the first system and copy independence indicating whether the data copy is to be dependent from the first system, and wherein the data protection objectives collectively specify an expected outcome of the data protection plan;
   for each of the selected data protection methods, determining a list of actions to be performed to satisfy expected outcome of the data protection objectives; and
   deploying a data protection policy representing the list of actions to the first system and the second system that provides data protection for the first system, including provisioning one or more data protection services in the first and second systems to carry out the list of actions.

2. The method of claim 1, wherein the list of actions includes at least one of data archiving, data backup, data deduplication, data replication, or data migration action.

3. The method of claim 1, wherein the first resource comprises data that represents the resource, including at least one of a file, a directory of one or more files, a storage volume of a storage disk, or an entire storage disk.

4. The method of claim 1, further comprising providing a second user interface to allow a user to configure each of the data protection objectives of the data protection plan, wherein each of the data protection objectives includes information about a measurable objective to be met.

5. The method of claim 1, further comprising evaluating an outcome of the data protection services in view of the data protection objectives to determine whether the data protection objectives have been met.

6. The method of claim 5, further comprising:
   transmitting one or more first requests to the first system to receive first metadata of a first data protection service performed at the first system;
   communicating with the second system to receive second metadata of a second data protection service performed at the second system; and
   examining the first and second metadata to determine whether a first of the data protection objectives associated with the first and second data protection services has been met.

7. The method of claim 6, wherein examining the first and second metadata comprises confirming whether the first and second data protection services were performed at a first starting time and lasted for a first duration specified by the first data protection objective.

8. The method of claim 7, further comprising confirming whether a first type of the data protection provided by the first and second data protection services conforms to a second type of data protection specified in the first data protection objective.

9. A non-transitory machine-readable medium having instructions stored therein, which when executed by a processor, cause the processor to perform operations of providing data protection of a data processing system, the operations comprising:
   in response to a request for data protection of a first resource of a first system of a first site, identifying a plurality of data protection methods that are available to provide data protection for the first resource, wherein the plurality of data protection methods include at least in part replication of the first resource from the first system of the first site into a second resource of a second system of a second site, and replication of the first resource into the second resource and subsequently replication of a snapshot of the second resource into a third resource of the second system of the second site;
   selecting one or more of the data protection methods based on one or more data protection objectives of a data protection plan that is associated with the first resource, wherein the data protection objectives include space efficiency indicating whether data copy is to include previously stored data segments from the first system and copy independence indicating whether the data copy is to be dependent from the first system, and wherein the data protection objectives collectively specify an expected outcome of the data protection plan;
   for each of the selected data protection methods, determining a list of actions to be performed to satisfy expected outcome of the data protection objectives; and
   deploying a data protection policy representing the list of actions to the first system and the second system that provides data protection for the first system, including provisioning one or more data protection services in the first and second systems to carry out the list of actions.

10. The non-transitory machine-readable medium of claim 9, wherein the list of actions includes at least one of data archiving, data backup, data deduplication, data replication, or data migration action.

11. The non-transitory machine-readable medium of claim 9, wherein the first resource comprises data that represents the resource, including at least one of a file, a directory of one or more files, a storage volume of a storage disk, or an entire storage disk.

12. The non-transitory machine-readable medium of claim 9, further comprising providing a second user interface to allow a user to configure each of the data protection objectives of the data protection plan, wherein each of the data protection objectives includes information about a measurable objective to be met.

13. The non-transitory machine-readable medium of claim 9, wherein the operations further comprise evaluating an outcome of the data protection services in view of the data protection objectives to determine whether the data protection objectives have been met.

14. The non-transitory machine-readable medium of claim 13, wherein the operations further comprise:
transmitting one or more first requests to the first system to receive first metadata of a first data protection service performed at the first system;
communicating with the second system to receive second metadata of a second data protection service performed at the second system; and
examining the first and second metadata to determine whether a first of the data protection objectives associated with the first and second data protection services has been met.

15. The non-transitory machine-readable medium of claim 14, wherein examining the first and second metadata comprises confirming whether the first and second data protection services were performed at a first starting time and lasted for a first duration specified by the first data protection objective.

16. The non-transitory machine-readable medium of claim 15, wherein the operations further comprise confirming whether a first type of the data protection provided by the first and second data protection services conforms to a second type of data protection specified in the first data protection objective.

17. A data processing system, comprising:
a processor; and
a memory coupled to the processor storing instructions, which when executed by the processor, cause the processor to perform operations, the operations including
in response to a request for data protection of a first resource of a first system of a first site, identifying a plurality of data protection methods that are available to provide data protection for the first resource, wherein the plurality of data protection methods include at least in part replication of the first resource from the first system of the first site into a second resource of a second system of a second site, and replication of the first resource into the second resource and subsequently replication of a snapshot of the second resource into a third resource of the second system of the second site,
selecting one or more of the data protection methods based on one or more data protection objectives of a data protection plan that is associated with the first resource, wherein the data protection objectives include space efficiency indicating whether data copy is to include previously stored data segments from the first system and copy independence indicating whether the data copy is to be dependent from the first system, and wherein the data protection objectives collectively specify an expected outcome of the data protection plan,
for each of the selected data protection methods, determining a list of actions to be performed to satisfy expected outcome of the data protection objectives, and
deploying a data protection policy representing the list of actions to the first system and the second system that provides data protection for the first system, including provisioning one or more data protection services in the first and second systems to carry out the list of actions.

18. The system of claim 17, wherein the list of actions includes at least one of data archiving, data backup, data deduplication, data replication, or data migration action.

19. The system of claim 17, wherein the first resource comprises data that represents the resource, including at least one of a file, a directory of one or more files, a storage volume of a storage disk, or an entire storage disk.

20. The system of claim 17, wherein the operations further comprise providing a second user interface to allow a user to configure each of the data protection objectives of the data protection plan, wherein each of the data protection objectives includes information about a measurable objective to be met.

21. The system of claim 17, wherein the operations further comprise evaluating an outcome of the data protection services in view of the data protection objectives to determine whether the data protection objectives have been met.

22. The system of claim 21, wherein the operations further comprise:
transmitting one or more first requests to the first system to receive first metadata of a first data protection service performed at the first system;
communicating with the second system to receive second metadata of a second data protection service performed at the second system; and
examining the first and second metadata to determine whether a first of the data protection objectives associated with the first and second data protection services has been met.

23. The system of claim 22, wherein examining the first and second metadata comprises confirming whether the first and second data protection services were performed at a first starting time and lasted for a first duration specified by the first data protection objective.

24. The system of claim 23, wherein the operations further comprise confirming whether a first type of the data protection provided by the first and second data protection services conforms to a second type of data protection specified in the first data protection objective.

* * * * *